United States Patent [19]
Yoshitoshi et al.

[11] Patent Number: 4,823,331
[45] Date of Patent: Apr. 18, 1989

[54] FOCUSING DETECTION APPARATUS

[75] Inventors: You Yoshitoshi; Yoshiyuki Matsumoto; Hidehiro Kume, all of Tokyo, Japan

[73] Assignee: Sony Corporation, Tokyo, Japan

[21] Appl. No.: 130,112

[22] PCT Filed: Feb. 18, 1987

[86] PCT No.: PCT/JP87/00105

§ 371 Date: Oct. 23, 1987

§ 102(e) Date: Oct. 23, 1987

[87] PCT Pub. No.: WO87/05142

PCT Pub. Date: Aug. 27, 1987

[30] Foreign Application Priority Data

Feb. 24, 1986 [JP] Japan .................................. 61-38576
May 31, 1986 [JP] Japan ................................ 61-126318

[51] Int. Cl.[4] ............................................... G11B 7/00
[52] U.S. Cl. ..................................... 369/45; 369/112; 350/96.11
[58] Field of Search ...................... 369/44, 45, 46, 112, 369/122; 350/96.11, 96.12, 96.13, 96.14, 96.15, 96.19, 96.16; 250/201, 216

[56] References Cited

U.S. PATENT DOCUMENTS

| 4,468,084 | 8/1984 | Hutcheson et al. | 350/96.11 |
| 4,542,492 | 9/1985 | Leterme et al. | 369/46 |
| 4,654,519 | 3/1987 | Ando | 250/216 |
| 4,672,187 | 6/1987 | Fujita et al. | 250/201 |
| 4,716,559 | 12/1987 | Hine | 369/112 |
| 4,718,052 | 1/1988 | Kondo et al. | 369/44 |
| 4,720,824 | 1/1988 | Hayashi | 369/44 |
| 4,725,725 | 2/1988 | Ando | 250/216 |
| 4,737,946 | 4/1988 | Yamashita et al. | 369/45 |
| 4,747,090 | 5/1988 | Yamashita et al. | 369/45 |

FOREIGN PATENT DOCUMENTS 52-33549 3/1977 Japan .
60-217535 10/1985 Japan .

OTHER PUBLICATIONS

Ura et al., Electronics and Communications in Japan, Part 2, vol. 70, No. 2, 1987, "An Integrated-Optic Disk Pickup Device," pp. 92-100.

Primary Examiner—William L. Sikes
Assistant Examiner—Frank González
Attorney, Agent, or Firm—Hill, Van Santen, Steadman & Simpson

[57] ABSTRACT

The present invention relates to a focusing detection apparatus (1) for detecting a focusing state of an optical recording medium. So as to achieve compactness and low cost of the focusing detection apparatus (1), focusing detection using two photosensors (33) (34) located in front of and behind a convergent point of a beam (45) reflected by the optical recording medium can be achieved by a single prism (37), and a plurality of optical components (31) (33) (34) (37) are formed integrally and can be arranged on a single surface of a semiconductor substrate (32). The present invention is applicable to an optical head requiring compactness, light weight, and low cost as well as high performance.

11 Claims, 9 Drawing Sheets

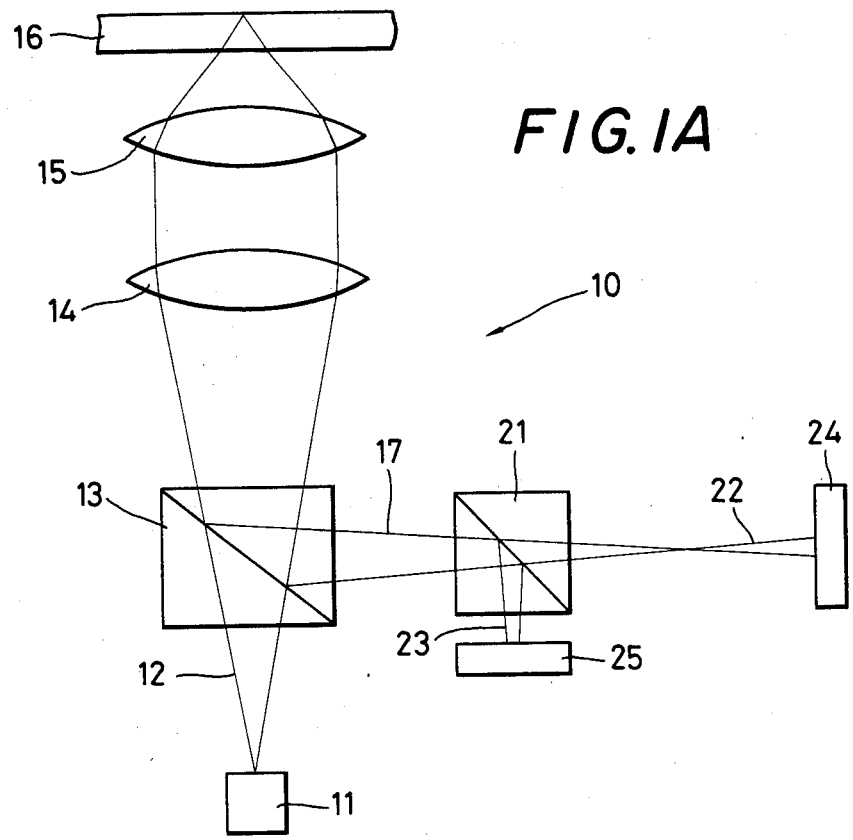
FIG. IA
FIG. IB
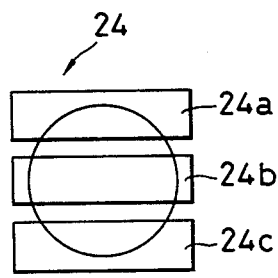
FIG. IC
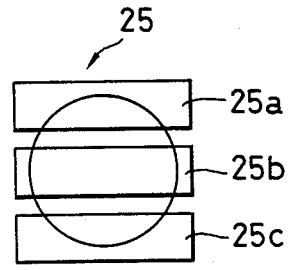

FOCUSING DETECTION APPARATUS

DESCRIPTION

1. Technical Field

The present invention relates to a focusing detection apparatus for detecting a focusing state of an optical recording medium.

2. Background Art

A focusing error signal representing a focusing state of an optical recording medium requires zero-crossing point symmetry, linearity near the zero-crossing point, elimination of reproduced signal mixing, and the like.

Japanese Patent Disclosure (Kokai) No. 60-217535 discloses a focusing detection apparatus 10 shown in FIG. 1A as a focusing detection apparatus satisfying the above requirements.

In the focusing detection apparatus 10, a beam 12 output from a light source 11 such as a laser diode is transmitted through a beam splitter 13, a collimator lens 14, and an objective lens 15 and is incident on an optical recording medium 16 such as an optical disk. A beam is reflected by the optical recording medium 16, is transmitted through the objective lens 15 and the collimator lens 14, and is reflected by the beam splitter 13. A beam 17 from the beam splitter 13 is split into first and second beams 22 and 23 by a beam splitter 21. A first photosensor 24 is spaced apart from the optical recording medium 16 by a distance longer than that between the optical recording medium 16 and a convergent point of the first beam 22. A second photosensor 25 is spaced apart from the optical recording medium 16 by a distance shorter than that between the optical recording medium 16 and a convergent point of the second beam 23. As shown in FIGS. 1B and 1C, a sum of detection signals from end photosensor elements 24a and 24c of the first photosensor 24 and a central photosensor element 25b of the second photosensor 25 is compared with a sum of detection signals from a central photosensor element 24b of the first photosensor 24 and end photosensor elements 25a and 25c of the second photosensor 25 to obtain a focusing error signal.

DISCLOSURE OF INVENTION

In such a focusing detection apparatus 10, the two beam splitters 13 and 21 are used. In addition, the light source 11, the beam splitters 13 and 21, and the photosensors 24 and 25 are independently arranged to complicate assembly, thus resulting in a bulky, expensive apparatus.

In order to solve the above problem, a focusing detection apparatus according to the present invention comprises a semiconductor laser fixed on a semiconductor substrate, a prism fixed on the semiconductor substrate, a first semi-transmissible reflecting surface formed on a prism surface opposite to the semiconductor laser, a second semi-transmissible reflecting surface constituted by a prism surface in contact with the semiconductor substrate and formed at a position where a beam passing through the first semi-transmissible reflecting surface is incident, a first photosensor including three photosensor elements formed on the semiconductor substrate at a position in contact with the first semi-transmissible reflecting surface and aligned in a predetermined direction, and a second photosensor including three photosensor elements aligned in a predetermined direction and formed on the semiconductor substrate at a position where the beam reflected by the second semi-transmissible reflecting surface is incident, wherein the optical recording medium is irradiated with the beam emitted from the semiconductor laser and reflected by the first semi-transmissible reflecting surface, a beam from the optical recording medium passed through the first semi-transmissible reflecting surface is converged after the beam is reflected by the second semi-transmissible reflecting surface but before the beam is incident on the second photosensor, and a sum of detection signals from end photosensor elements of the three photosensor elements of the first photosensor and a central photosensor element of the three photosensor elements of the second photosensor is compared with that from a central photosensor element of the three photosensor elements of the first photosensor and end photosensor elements of the three photosensor elements of the second photosensor to produce a focusing error signal for the optical recording medium.

In the focusing detection apparatus of the present invention, the prism has the first and second semi-transmissible reflecting surfaces. The single prism has both a beam splitter function for splitting the beam for radiating the optical recording medium and the beam from the optical recording medium and a beam splitter function for splitting the beam from the optical recording medium into beams for detecting the beam before and after its convergent point.

In addition, the semiconductor laser, the prism and the first and second photosensors are integrally formed. A plurality of these optical components can be arranged on a single surface of a semiconductor substrate.

In the focusing detection apparatus according to the present invention, therefore, focusing detection using two photosensors located before and after the convergent point of the beam from the optical recording medium can be performed by a single prism. The number of components can be reduced, and the resultant apparatus is compact and inexpensive.

Since the plurality of optical components are integrally formed, assembly operations can be simplified, and since the plurality of optical components can be arranged on a single surface of a semiconductor substrate, fablications can be simplified, thereby providing a low-cost apparatus.

BRIEF DESCRIPTION OF DRAWINGS

FIG. 1A is a side view showing a conventional example associated with the present invention;

FIGS. 1B AND 1C are respectively plan views of photosensors in the conventional example;

BEST MODE OF CARRYING OUT THE INVENTION

First to fifth embodiments of the present invention will be described with reference to FIGS. 2 to 12.

Figure 2:
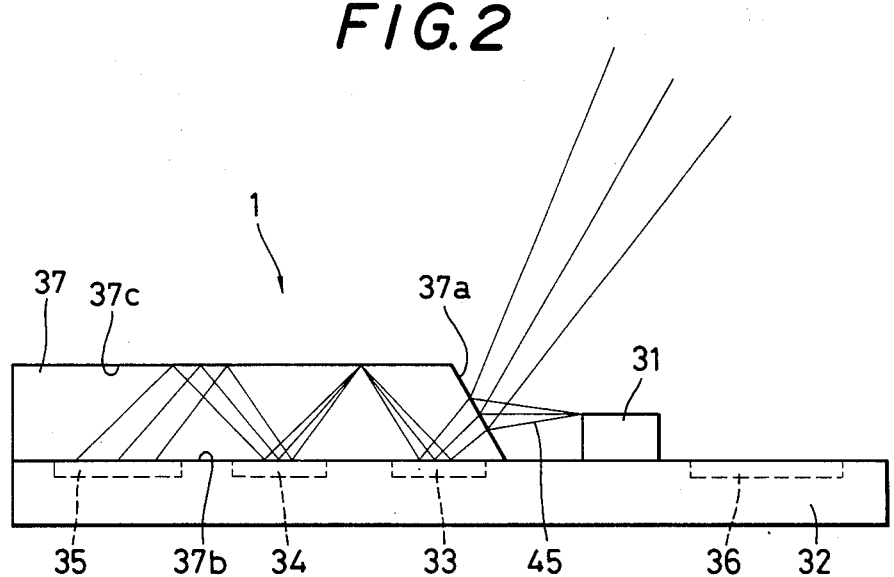
FIG. 2 is a side view showing a first embodiment of the present invention.

FIG. 2 shows the first embodiment of the present invention. In a focusing detection apparatus 1 of the first embodiment, a laser diode 31 is fixed on an Si substrate 32 by tin soldering or the like. At the same time, photosensors 33 to 36 comprising photodiodes are formed on the Si substrate 32. A prism 37 made of BK7 and having a trapezoidal sectional shape is fixed on the photosensors 33 to 35 with an adhesive, thus constituting a hybrid integrated apparatus as the focusing detection apparatus.

A surface 37a of the prism 37 on the side opposite to the laser diode 31 and a portion of a surface 37b in contact with the Si substrate 32 except for a portion near the photosensor 35 are semi-transmissible reflecting surfaces. A surface 37c opposite to the surface 37b is a reflecting surface.

Figure 3:
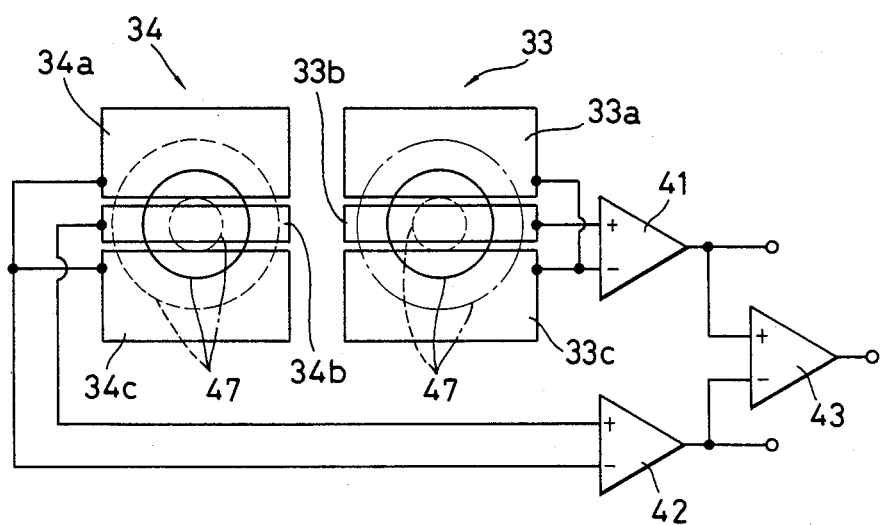
FIG. 3 is a schematic view showing photosensors and its peripheral circuits in the first embodiment.

The photosensors 33 and 34 respectively comprise three photosensor elements 33a to 33c aligned in a predetermined direction and three photosensor elements 34a to 34c aligned in a predetermined direction, as shown in FIG. 3. The photosensor elements 33a to 33c and 34a to 34c are connected to operational amplifiers 41 to 43.

Figure 8:
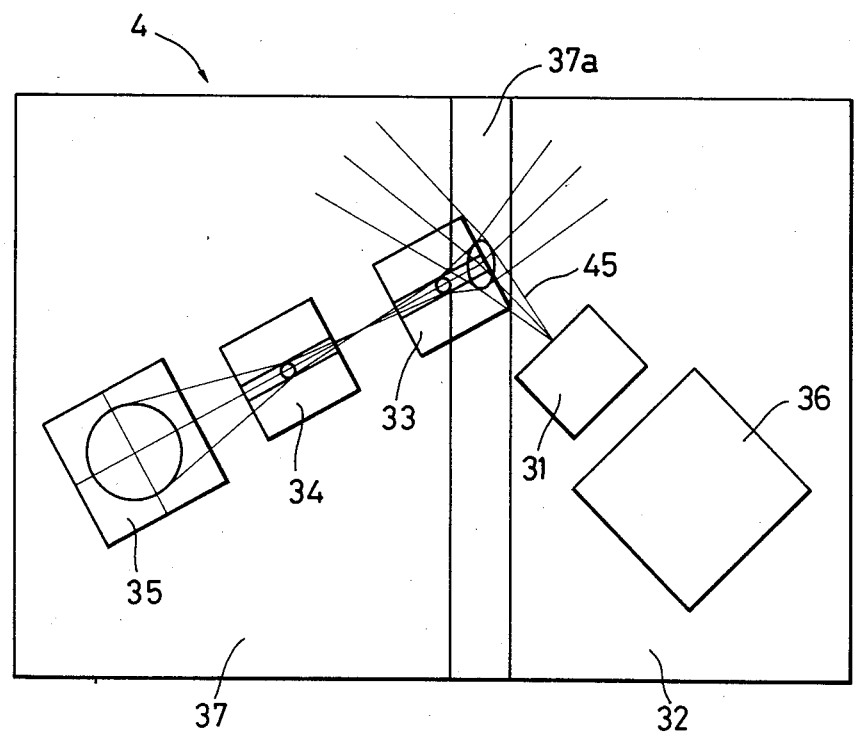
FIG. 8 is a plan view showing a fourth embodiment of the present invention.

The photosensor 35 comprises four photosensor elements arranged, as shown in FIG. 8, and is used for tracking detection. The photosensor 36 is used for automatic power control of the laser diode 31.

Figure 4:
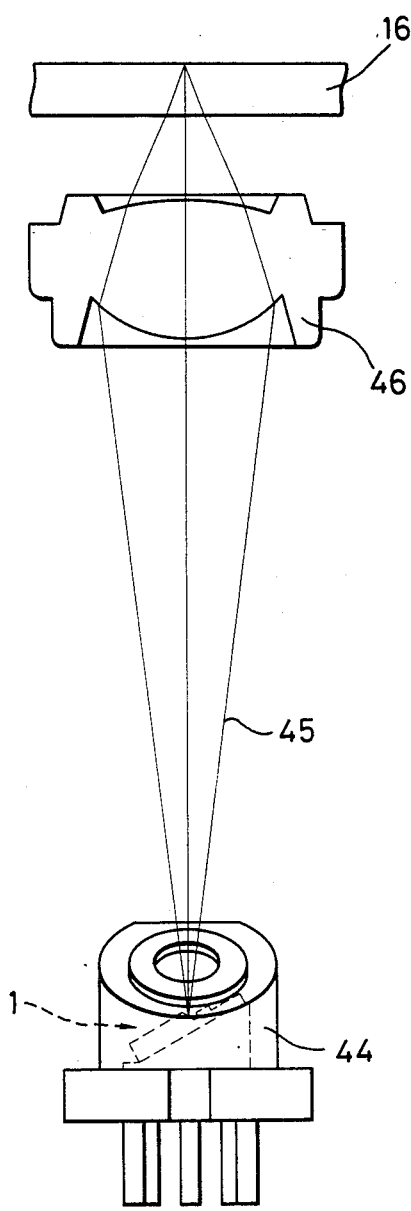
FIG. 4 is a side view showing an application of the first embodiment.

The focusing detection apparatus 1 is sealed in a cap 44, as shown in FIG. 4.

In the focusing detection apparatus 1 of the first embodiment, some of beams 45 emitted from the laser diode 31 are reflected by the surface 37a and pass through an objective lens 46 having a definite magnification. The beams from the objective lens 46 are incident on an optical recording medium 16.

Some of the beams 45 reflected by the optical recording medium 16, passing through the objective lens 46, and input to the surface 37a pass through the surface 37a and are incident on the surface 37b. Since the portion of the surface 37b near the photosensor 33 is the semi-transmissible reflecting surface, some of the beams 45 pass through the surface 37b and are incident on the photodetector 33, and the remaining beams are reflected by the surface 37b.

The beams 45 reflected by the surface 37b are reflected by the surface 37c and are incident again on the surface 37a. Some of the beams 45 incident on the surface 37a are incident on the photosensor 34, and the remaining beams are reflected by the surfaces 37a and 37c and are incident on the photosensor 35.

In the focusing detection apparatus 1 of the first embodiment, the size and the like of the prism 37 are determined such that a point conjugate with a convergent point of the beam 45 is located on the surface 37c when the optical recording medium 16 is located at the convergent point of the beam 45.

As shown in FIG. 3, spots 47 of the beams 45 on the photosensors 33 and 34 have the same size when the optical recording medium 16 is located at the convergent point of the beam 45. When the optical recording medium 16 is deviated from the convergent point of the beam 45, one spot 47 becomes larger and the other spot 47 becomes smaller.

Figure 5:
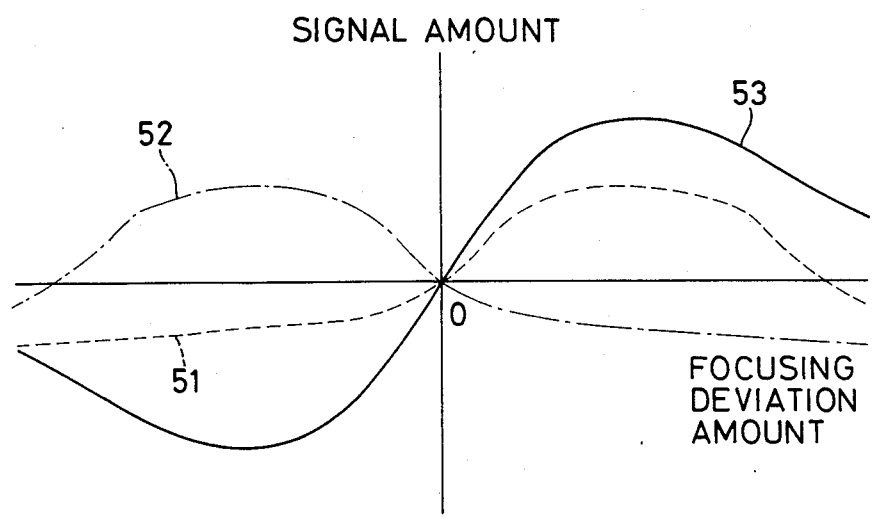
FIG. 5 is a graph showing signals produced by the circuit of FIG. 3.

As a result, the operational amplifiers 41, 42, and 43 generate signals indicated by curves 51, 52, and 53 in FIG. 5, respectively. Therefore, when a signal output from the operational amplifier 43 serves as a focusing error signal, the focusing error signal has good characteristics in terms of zero-crossing point symmetry, linearity near the zero-crossing point, and elimination of reproduced signal mixing.

Figure 6:
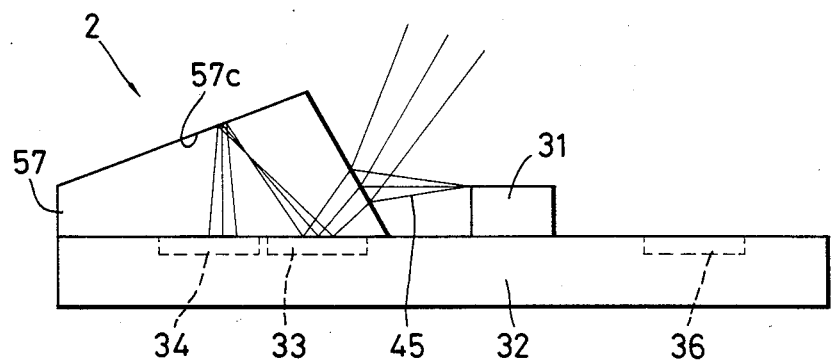
FIGS. 6 and 7 are respectively side views showing second and third embodiments of the present invention.

FIG. 6 shows a second embodiment. A focusing detection apparatus 2 of the second embodiment is substantially the same as the focusing detection apparatus 1 of the first embodiment, except that a prism 57 does not have a trapezoidal sectional shape and a beam 45 is not focused on a surface 57c.

In the focusing detection apparatus 2 of the second embodiment, even if a small scratch is formed in a portion of the surface 57c which reflects the beam 45, the beam 45 is not adversely affected by such a scratch. For this reason, focusing detection can be stably performed.

Figure 7:
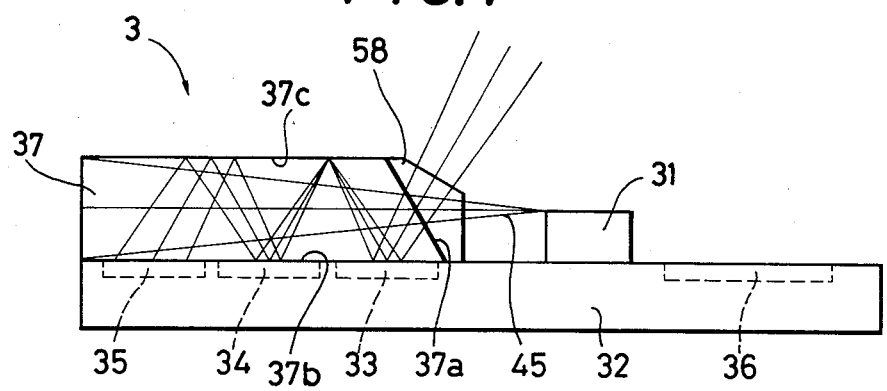

FIG. 7 shows a third embodiment. A focusing detection apparatus 3 of the third embodiment is substantially the same as the focusing detection apparatus 1 of the first embodiment, except that a prism 58 made of the same material as that of the prism 37, i.e., BK7 is arranged in tight contact with the surface 37a of the prism 37 so that a beam 45 emitted from the laser diode 31 toward the surface 37a is incident perpendicularly on a surface of the prism 58 and that a beam 45 reflected by the surface 37a is outgoing perendicularly from a surface of the prism 58.

In the focusing detection apparatus 3 of the third embodiment, the beam 45 emitted from the laser diode 31 and passing through the surface 37a propagates straight without refraction, as is apparent from FIG. 7. For this reason, a small amount of stray light is incident on photosensors 33 to 35, and focusing detection can be performed with high sensitivity.

FIG. 8 shows a fourth embodiment. A focusing detection apparatus 4 of the fourth embodiment is substantially the same as the focusing detection apparatus 1 of the first embodiment, except that a line connecting a laser diode 31 and a photosensor 36 crosses a line connecting photosensors 33 to 35.

In the focusing detection apparatus 4 of the fourth embodiment, a beam 45 emitted from the laser diode 31 and passing through a surface 37a is not directed toward photosensors 33 to 35, and stray light is rarely incident on the photosensors 33 to 35.

Figure 9:
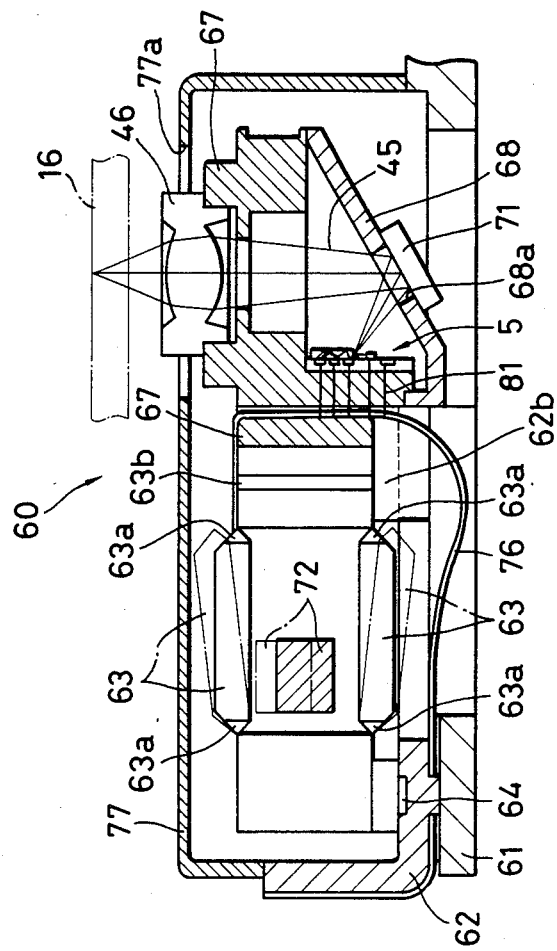
FIG. 9 is a side sectional view of an optical head to which a fifth embodiment of the present invention is applied.
Figure 10:
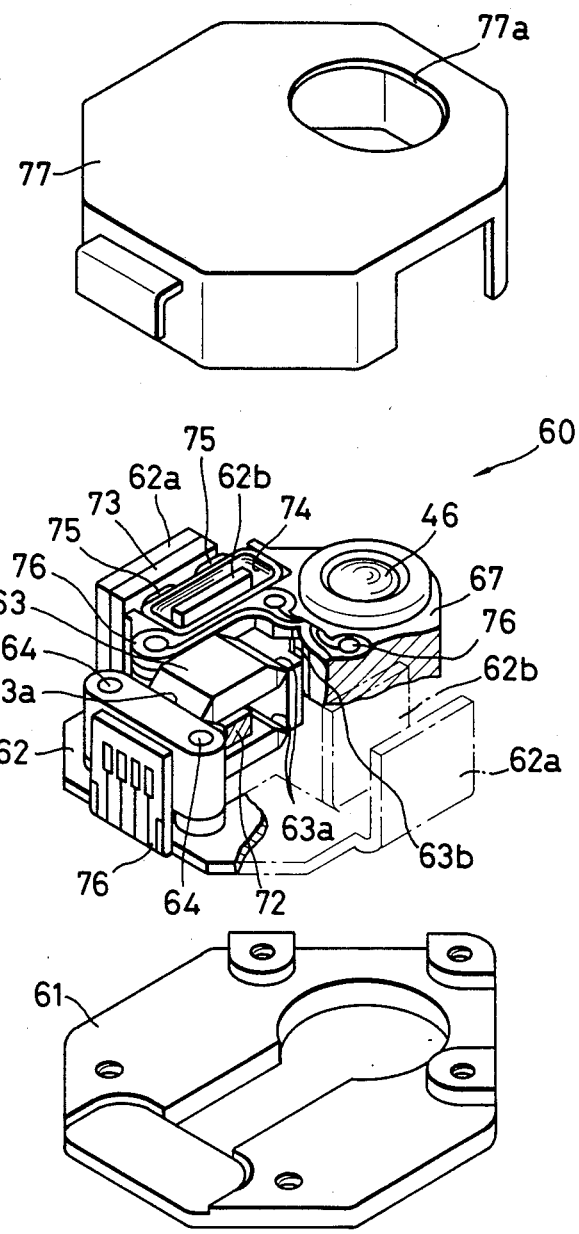
FIG. 10 is an exploded perspective view of the optical head shown in FIG. 9.

FIGS. 9 and 10 show an optical head to which a fifth embodiment is applied. In the optical head 60, a plate-like yoke member 62 is mounted on a base 61, and a molded hinge member 63 is mounted on the yoke member 62 through a pin 64.

A holding member 67 adapted to hold an objective lens 46 and a focusing detection apparatus 5 of the fifth embodiment is mounted on the distal end of the hinge member 63. The objective lens 46 has a definite magnification such that an object-image distance is 14 mm. A cover 68 having an opening 68a is adhered to the holding member 67. A mirror 71 is adhered to the cover 68 to close the opening 68a.

For this reason, the space of the holding member 67 in which the focusing detection apparatus 5 is located is kept air-tight by the holding member 67, the objective lens 46, the cover 68, and the mirror 71.

The hinge member 63 comprises hinges 63a for causing the holding member 67 and the like to swing in an optical axis of the objective lens 46, as indicated by the alternate long and short dashed line of FIG. 9 so as to perform focusing control, and hinges 63b for causing the holding member 67 and the like to swing in a direction perpendicular to the optical axis of the objective lens 46 so as to perform tracking control.

A counterweight 72 is mounted on the holding member 67 at a position opposite to the objective lens 46 with respect to the hinges 63b so as to prevent pivotal movement of the holding member 77 and the like about the hinges 63b due to the weight of the holding member 67 and the like when the optical head 60 as a whole is inclined.

Vertical bent portions 62a and 62b are formed in the yoke member 62, and magnets 73 are mounted on a surfaces of the vertical bent portions 62a at positions opposite to the corresponding vertical bent portions 62b. Focusing coils 74 are mounted in the holding member 67 so as to surround the vertical bent portions 62b. Tracking coils 75 are mounted on the focusing coils 74 so as to oppose the magnets 73.

It should be noted that the pair of vertical bent portions 62a, the pair of vertical bent portions 62b, the pair of magnets 73, the pair of focusing coils 74, and the pair of tracking coils 75 are mounted at positions symmetrical about the hinge member 63.

One end of a flexible wiring board 76 is fixed to the surface of the holding member 67 on the side opposite to the yoke member 62. The flexible wiring board 76 extends through the notched portion of the holding member 67 and is parallel to the optical axis of the objective lens 46. The flexible wiring board 76 further extends at the side of the base 61 of the yoke member 62 and reaches a position to become parallel to the pin 64.

The hinge member 63, the holding member 67, and the like are covered by the cap 77 having an opening 77a located at a position corresponding to the objective lens 46.

Figure 11:
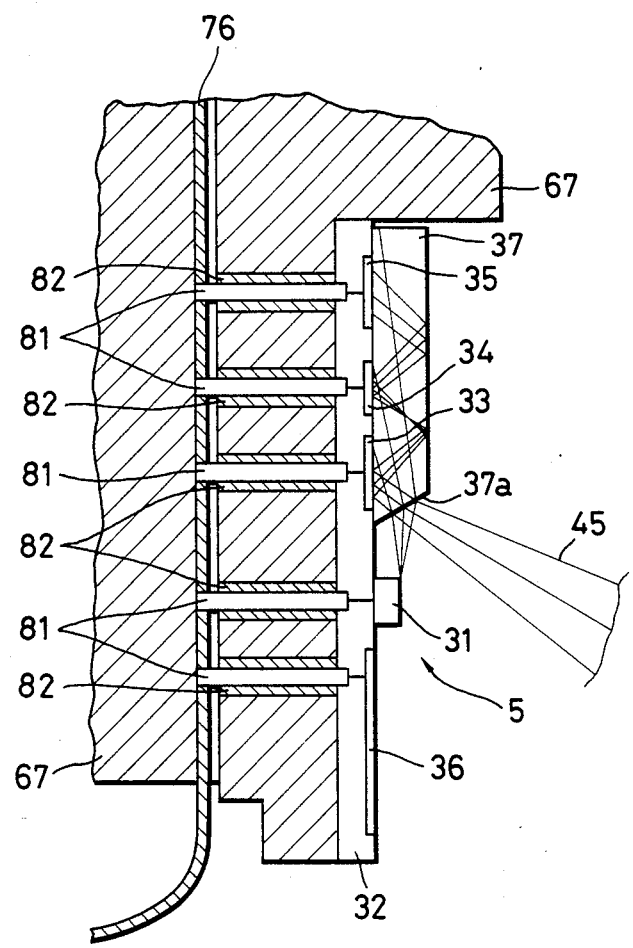
FIGS. 11 and 12 are respectively a side view and a front view of the fifth embodiment.
Figure 12:
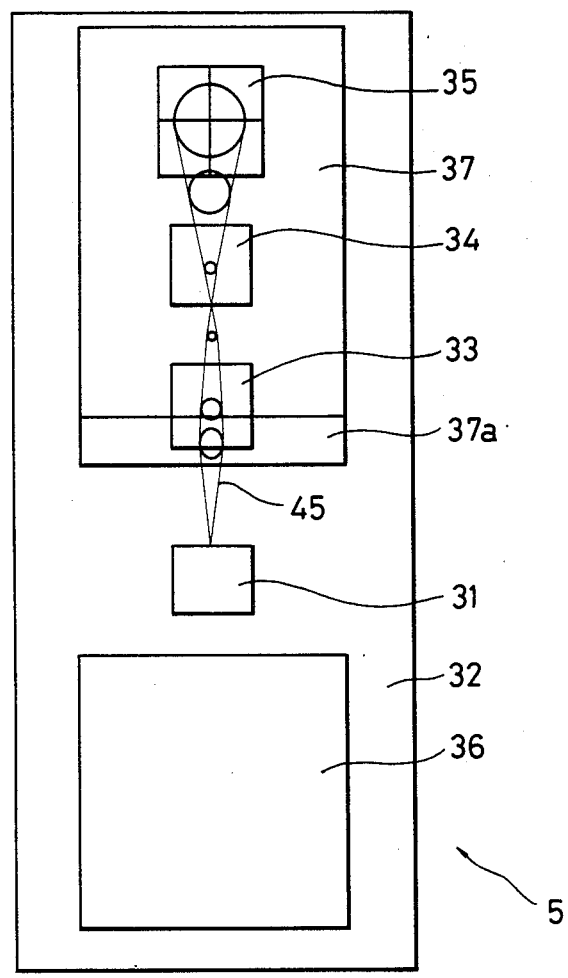

FIGS. 11 and 12 show the detailed structure of the focusing detection apparatus 5 and its peripheral portion. The focusing detection apparatus 5 has substantially the same arrangement as the focusing detection apparatus 1 of the first embodiment. A laser diode 31 of the focusing detection apparatus 5 is fixed on an Si substrate 32, photosensors 33 to 36 are formed on the Si substrate 32, and a prism 37 is fixed on the photosensors 33 to 35, thus constituting a hybrid integrated apparatus.

The laser diode 31 and the photosensors 33 to 36 are electrically connected to corresponding pins 81 by wire bonding. The pins 81 extend through the wall surface of the holding member 67 while the pins 81 are kept insulated from a holding member 67 by glass 82. The distal ends of the pins 81 are connected to a flexible wiring board 76.

In the optical head having the arrangement described above, the beam 45 emitted from the laser diode 31 and reflected by the surface 37a of the prism 37 is further reflected by the mirror 71. The reflected beam passes through the objective lens 46 and is focused on the recording surface of the optical recording medium 16.

The beam 45 reflected by the recording surface of the optical recording medium 16 propagates the optical path in the opposite direction and reaches the surface 37a of the prism 37. The beam 45 incident from the surface 37a on the prism 37 repeats reflection within the prism 37 and is finally incident on the photosensors 33 to 35.

The beam 45 in the prism 37 is focused on an optical path between the photosensors 33 and 34. A differential output from the photosensors 33 and 34 is supplied as a focusing error signal to the focusing coils 74.

An output difference between the diagonal sums of the photosensor 35 is supplied as a tracking error signal to the tracking coils 75. A sum of outputs from the photosensors 33 to 35 is used as an RF signal.

Since the objective lens 46 has a definite magnification in the optical head 60 having the arrangement described above, a collimator lens can be omitted. In addition, the single focusing detection apparatus 5 can perform both light emission and light reception. Therefore, the number of components can be reduced.

The optical head 60 is compact and lightweight since it requires a small number of components. The small number of components allows easy assembly, reduction of cost of components, and a low adjustment cost.

Furthermore, since the light-emitting and light-receiving portions are arranged in the single focusing detection apparatus 5, the holding member 67 of the objective lens 46 serves as a package of the focusing detection apparatus 5, thereby further reducing the cost of the optical head 60.

Since the optical head 60 is compact and lightweight, a wide servo range can be obtained, and high performance of the optical head can be achieved. Industrial Applicability According to the present invention, there is provided a compact, low-cost focusing detection apparatus. Therefore, the present invention is applicable to an optical head which requires compactness, light weight and low cost as well as high performance.

We claim:

1. A focusing detection apparatus comprising:
   a semiconductor laser fixed on a semiconductor substrate;
   a prism fixed on said semiconductor substrate;
   a first semi-transmissible reflecting surface formed on a prism surface opposite to said semiconductor laser;
   a second semi-transmissible reflecting surface constituted by a prism surface in contact with said semiconductor substrate and formed at a position where a beam passing through said first semi-transmissible reflecting surface is incident;
   a first photosensor including three photosensor elements formed on said semiconductor substrate at a position in contact with said first semi-transmissible reflecting surface and aligned in a predetermined direction; and
   a second photosensor including three photosensor elements aligned in a predetermined direction and formed on said semiconductor substrate at a position where the beam reflected by said second semi-transmissible reflecting surface is incident,
   wherein the optical recording medium is irradiated with the beam emitted from said semiconductor laser and reflected by said first semi-transmissible reflecting surface,
   a beam from the optical recording medium passed through said first semi-transmissible reflecting surface is converged after the beam is reflected by said second semi-transmissible reflecting surface but before the beam is incident on said second photosensor, and a sum of detection signals from end photosensor elements of said three photosensor elements of said first photosensor and a central photosensor element of said three photosensor elements of said second photosensor is compared with that from a central photosensor element of said three photosensor elements of said first photosensor and end photosensor elements of said three photosensor elements of said second photosensor to produce a focusing error signal for the optical recording medium.

2. An apparatus according to claim 1, characterized in that the predetermined direction along which said three photosensor elements of said first photosensor are aligned is the same as the predetermined direction along which said three photosensor elements of said second photosensor are aligned.

3. An apparatus according to claim 2, characterized in that said three photosensor elements of said first photosensor are respectively arranged adjacent to said three photosensor elements of said second photosensor.

4. An apparatus according to any one of claims 1 to 3, characterized in that said focusing detection apparatus is sealed in a cap.

5. An apparatus according to any one of claims 1 to 3, characterized in that said focusing detection apparatus is sealed in a holding member for holding an objective lens therein.

6. An apparatus according to claim 5, characterized in that said objective lens held in said holding means and a cover mounted on said holding member seal said focusing detection apparatus.

7. An apparatus according to claim 6, characterized in that a mirror is mounted on said cover.

8. An apparatus according to claim 7, characterized in that said mirror is inclined at a predetermined angle with respect to an optical axis of said objective lens.

9. An apparatus according to claim 5, characterized in that said holding member is movable along a focusing direction.

10. An apparatus according to claim 9 characterized in that said holding member is movable along a tracking direction.

11. An apparatus according to claim 5, characterized in that said holding member is movable along a tracking direction.

* * * * *